United States Patent
Span et al.

(10) Patent No.: US 11,485,412 B2
(45) Date of Patent: Nov. 1, 2022

(54) DRAG LINK GUIDE ASSEMBLY, STEERING ACTUATOR AND METHOD FOR PRODUCING A DRAG LINK GUIDE ASSEMBLY

(71) Applicant: ZF Automotive Germany GmbH, Alfdorf (DE)

(72) Inventors: Eduard Span, Cologne (DE); Sridharan Krishnan, Neuss (DE); Robert Kolloch, Mönchengladbach (DE)

(73) Assignee: ZF Automotive Germany GmbH, Alfdorf (DE)

( * ) Notice: Subject to any disclaimer, the term of this patent is extended or adjusted under 35 U.S.C. 154(b) by 0 days.

(21) Appl. No.: 17/113,277

(22) Filed: Dec. 7, 2020

(65) Prior Publication Data

US 2021/0171096 A1 Jun. 10, 2021

(30) Foreign Application Priority Data

Dec. 6, 2019 (DE) .......................... 102019133406.3

(51) Int. Cl.
*B62D 3/12* (2006.01)
*B62D 7/20* (2006.01)
(Continued)

(52) U.S. Cl.
CPC ................ *B62D 7/20* (2013.01); *F16C 17/04* (2013.01); *F16C 29/02* (2013.01); *F16C 33/04* (2013.01); *F16C 33/20* (2013.01)

(58) Field of Classification Search
CPC .... B62D 7/16; B62D 7/20; B62D 3/12; F16C 17/04; F16C 29/00; F16C 29/001;
(Continued)

(56) References Cited

U.S. PATENT DOCUMENTS

| 7,926,378 | B2 * | 4/2011 | Saito | ........................ | B62D 3/12 |
| | | | | | 74/422 |
| 2002/0085778 | A1 * | 7/2002 | Mena | ....................... | B62D 3/12 |
| | | | | | 384/276 |

(Continued)

FOREIGN PATENT DOCUMENTS

| DE | 1204025 B | 10/1965 | | |
| DE | 102018220314 A1 * | 5/2020 | ........... | B62D 5/0424 |

(Continued)

OTHER PUBLICATIONS

Description Translation for DE 1204025 from Espacenet (Year: 1965).*

*Primary Examiner* — James A English
*Assistant Examiner* — Daniel M. Keck
(74) *Attorney, Agent, or Firm* — Robert James Harwood (57) ABSTRACT

A drag link guide assembly for guiding a drag link comprises a slide bushing and a housing enclosing the slide bushing. The housing comprises a socket portion, into which the slide bushing is inserted. The slide bushing comprises a locating area for the drag link having a substantially circular cylindrical periphery with at least one plane torsional locking face. The slide bushing comprises an outward-pointing structure, which interacts with a mating structure that is provided on the internal surface of the housing. A method for producing a drag link guide assembly is furthermore described.

7 Claims, 4 Drawing Sheets

(51) Int. Cl.
*F16C 17/04* (2006.01)
*F16C 29/02* (2006.01)
*F16C 33/04* (2006.01)
*F16C 33/20* (2006.01)

(58) Field of Classification Search
CPC .... F16C 29/004; F16C 29/005; F16C 29/007; F16C 29/008; F16C 29/02; F16C 31/02; F16C 33/04; F16C 33/20
See application file for complete search history.

(56) References Cited

U.S. PATENT DOCUMENTS

| | | |
|---|---|---|
| 2015/0020618 A1 | 1/2015 | Kawakubo |
| 2015/0204381 A1 | 7/2015 | Zaike et al. |
| 2015/0274193 A1* | 10/2015 | Saito ................. F16C 29/02 74/422 |
| 2016/0061256 A1 | 3/2016 | Nakagawa et al. |
| 2017/0130769 A1 | 5/2017 | Ikeda et al. |

FOREIGN PATENT DOCUMENTS

| | | | | |
|---|---|---|---|---|
| JP | 2017185849 A | * | 10/2017 | |
| WO | WO-2012032708 A1 | * | 3/2012 | ............... B62D 3/12 |
| WO | 2019078254 A1 | | 4/2019 | |

* cited by examiner

DRAG LINK GUIDE ASSEMBLY, STEERING ACTUATOR AND METHOD FOR PRODUCING A DRAG LINK GUIDE ASSEMBLY

CROSS-REFERENCE TO RELATED APPLICATION

This application claims priority to German Patent Application No. 102019133406.3 filed Dec. 6, 2019, the disclosure of which is incorporated herein by reference in its entirety.

TECHNICAL FIELD

The present disclosure relates to a drag link guide assembly for guiding a drag link. The present disclosure further relates to a steering actuator having a drag link guide assembly. In addition, the present disclosure relates to a method for producing a drag link guide assembly for guiding a drag link.

BACKGROUND

In modern motor vehicles use may be made of a so-called steer-by-wire (SbW) steering system, in which there is no longer any mechanical connection between the steering wheel and the drag link. The drag link is assigned to a steered axle of the corresponding motor vehicle, wherein the drag link is actuated by a steering actuator which is electronically controlled as a function of a detected steering angle on the steering wheel. In this respect only an electronic connection exists between the steering wheel and the drag link.

Owing to the absence of a mechanical connection between the steering wheel and the drag link, the support and guidance of the drag link in a steer-by-wire steering system differs from that of conventional steering systems, which still have a mechanical connection by way of a pinion and the drag link.

In particular, different demands are placed on the guidance of the drag link, that is to say a drag link guide assembly, since the steering actuator in a steer-by-wire steering system may comprise a belt drive together with a recirculating ball gear. As a result, high drag link forces can occur, for example in excess of 3 kN, which have to be taken into account in guiding the drag link.

Furthermore, a permanent torque must be exerted on the drag link by way of the steering actuator, since the mechanical support for the drag link is no longer assured due to the absence of a mechanical connection. The drag link guide assembly must therefore allow a permanent transmission of the torque. Moreover, the drag link is fundamentally to be guided with as little friction as possible, so that in steering the motor vehicle the drag link is able to slide easily through the drag link guide assembly.

SUMMARY

The object is to provide a robust, low-friction and cost-effective drag link guide assembly, cable of guiding a drag link, particularly in a steer-by-wire steering system.

According to the present disclosure the object is achieved by a drag link guide assembly for guiding a drag link, comprising a slide bushing and a housing enclosing the slide bushing. The housing comprises a socket portion, into which the slide bushing is inserted. The slide bushing comprises a locating area for the drag link having a substantially circular cylindrical periphery with at least one plane torsional locking face. The slide bushing comprises an outward-pointing structure which interacts with a mating structure that is provided on the internal surface of the housing.

According to the present disclosure the object is further achieved by a method for producing a drag link guide assembly for guiding a drag link, comprising the following steps:

provision of a housing which comprises a socket portion, and insertion, into the socket portion of the housing, of a slide bushing which comprises a locating area for the drag link having a substantially circular cylindrical periphery with at least one plane torsional locking face. The slide bushing comprises an outward-pointing structure which when the slide bushing is inserted interacts with a mating structure that is provided on the internal surface of the housing.

The fundamental idea of the present disclosure is that the drag link guide assembly comprises a torsional lock for the guided drag link, since the drag link is received so that it cannot twist in the locating area of the slide bushing. For this purpose, the locating area has at least one plane torsional locking face, on which the drag link bears with a correspondingly formed face, so that a relative rotation between the drag link and the slide bushing is not possible. The torsional lock between the drag link and the slide bushing is therefore a positively interlocking torsional lock.

In addition, the drag link guide assembly comprises a torsional lock between the slide bushing and the housing which accommodates the slide bushing, since a structure and a corresponding mating structure are provided, which in the assembled state interact in such a way, that a relative rotation is not possible. In other words, the structure provided on the slide bushing engages in the mating structure provided on the housing so as to prevent a torsion of the slide bushing relative to the housing and vice versa. The torsional lock between the slide bushing and the housing is accordingly likewise a positively interlocking torsional lock.

The housing may be of stationary design or fixed to the vehicle.

The slide bushing may be produced from a plastic material. The slide bushing is in this respect inexpensive to produce, the slide bushing at the same time having a low weight and a low coefficient of friction. Moreover, the plastic material of the slide bushing can help to ensure that the slide bushing is wear-resistant.

The slide bushing can furthermore be easily inserted, in particular pressed, into the housing. The drag link guide assembly is therefore correspondingly easy to assemble.

In one aspect of the present disclosure the outward-pointing structure is sited, at least in part, on a portion of the slide bushing projecting in an axial direction. The slide bushing may comprise a body from which the portion projecting in an axial direction protrudes in an axial direction. In the assembled state of the drag link guide assembly the portion projecting in an axial direction may point away from the socket portion of the housing. In particular, the portion projecting in an axial direction is provided on the side of the body which points away from the aperture of the socket portion of the housing. This results in a compact drag link guide assembly, in particular a compact slide bushing, since the torsional lock, in part formed by the structure, is not provided at the radially outermost point of the slide bushing.

In particular, the portion projecting in an axial direction at least in part forms the locating area for the drag link. This means that the portion projecting in an axial direction defines the locating area radially outwards, the outward-pointing structure being provided on the outer surface of the portion projecting in an axial direction. The portion projecting in an axial direction can therefore be of annular formation, its inside at least in part forming the locating area for the drag link.

In the area of the torsional locking face the portion projecting in an axial direction may have a greater wall thickness than in the remaining area, in order to form the torsional locking face in the otherwise circular cylindrical locating area. This applies moreover to the slide bushing as a whole.

The portion projecting in an axial direction may furthermore be integrally formed with a body of the slide bushing.

In principle the entire slide bushing may be formed in one piece, for example as a plastic part.

In a further aspect of the present disclosure the outward-pointing structure comprises multiple radially outward-projecting webs or projections and/or the mating structure comprises at least one depression in the internal surface of the housing. In other words, the structure is formed by outward projecting webs or ribs, whereas the mating structure on the internal surface of the housing is formed by corresponding recesses or depressions. Instead of the webs or ribs other broader projections may also be provided, which have a greater extent in a circumferential direction than the webs or ribs.

The webs or ribs may in each case be provided in twos, resulting in pairs of webs or ribs.

The number of webs or pairs of webs is less than the number of depressions or recesses. The ratio is 2:1, for example.

In addition, the projections or webs, in particular the pairs of webs, and the depressions are in each case spaced at uniform radial intervals from one another, thereby accordingly facilitating assembly of the drag link guide assembly, since the slide bushing can be inserted into the housing in multiple different positions.

The number of projections may also correspond to the number of depressions or recesses.

According to a further aspect of the present disclosure an axial stop is provided at one end of the socket portion. The slide bushing is therefore inserted into the socket portion of the housing until the slide bushing encounters the axial stop, which is formed in the housing. This results in a defined positioning of the slide bushing in an axial direction inside the housing.

The axial stop may be formed, for example, by a corresponding shaping of the housing, for example a step.

In particular, the mating structure is formed on the axial stop. In this respect a dual function attaches to the axial stop, since it defines the position of the slide bushing in an axial direction and at the same time, at least in part, forms the torsional lock.

The axial stop may be of a circumferentially castellated formation. This means that the height or material thickness of the axial stop in a radial direction alternates between a first height and a second height.

The depressions or recesses may accordingly be open to the socket portion in an axial direction. The depressions or recesses are in as much visible when seen in top view towards a front end of the housing, since they are formed on the axial stop and at the same time are open towards the socket portion.

The depressions or recesses may furthermore widen out towards the socket portion. This ensures that it is possible to center the slide bushing in relation to the housing, when the slide bushing is being inserted into the housing. This makes it correspondingly easier to fit or assemble the drag link guide assembly.

Furthermore, the socket portion may be of substantially circular cylindrical formation and may have a radially circumferential groove on its inside. The groove may have an undercut. The slide bushing can be inserted over the entire socket portion, that is to say from the open axial end as far as the axial stop, since the groove is recessed in relation to the inside.

In addition, a fixing bush, which fixes the slide bushing in an axial direction inside the locating area, may be accommodated in the socket portion. The fixing bush can be inserted into the socket portion once the slide bushing has been inserted, so that the fixing bush presses the slide bushing against the axial stop provided at the end of the locating area. The slide bushing is thereby fixed in an axial position in the locating area of the housing, so that the slide bushing cannot be displaced in an axial direction.

The fixing bush may furthermore have at least one spring lug, which is provided radially outside, the spring lug engaging in the groove in order to secure the fixing bush in an axial direction inside the socket portion. The fixing bush can therefore no longer be moved in the direction of the open end of the housing, since the spring lug engaging in the groove prevents such a movement.

The slide bushing is therefore completely fixed in the socket portion, since it bears on the axial stop of the housing (first axial direction) and at the same time is secured or fixed by the fixing bush (second axial direction).

The fixing bush is moreover completely fixed in the socket portion, since by way of the slide bushing it bears (indirectly) on the axial stop of the housing (first axial direction) and at the same time is secured or fixed by the spring lug engaging in the groove (second axial direction).

An elastic force transmission element can furthermore be provided between the fixing bush and the slide bushing. The elastic force transmission element serves, among other things, to compensate for manufacturing and fitting tolerances when assembling the drag link guide assembly, since the force transmission element is of elastic or compressible design. In addition, forces acting in an axial direction can be partially compensated for via the elastic force transmission element.

The elastic force transmission element may simply take the form of an elastic O-ring.

The drag link guide assembly can at the same time serve as a stop. In particular, when the drag link guide assembly is assigned to an end area of the drag link, the drag link guide assembly may form a stop face for a ball-and-socket joint assembly of the steering system, particularly the ball-and-socket joint assembly assigned to the inner steering tie rod joint.

According to its positioning, the drag link guide assembly can in this respect also serve to limit the movement of the drag link.

The elastic force transmission element then results in a soft stop, that is to say a soft steering limit stop. In other words, the elastic or compressible force transmission element is capable of furnishing the stop face.

In particular, the fixing bush together with the elastic force transmission element provides the soft stop, that is to say the soft steering limit stop.

In addition, the drag link guide assembly may serve to dissipate energy, in particular via the elastic force transmission element, which is correspondingly deformed.

The drag link guide assembly may basically comprise a drag link. The drag link may have a flattening, with which the drag link bears on the plane torsional locking face, in order to thus form a torsional lock, which prevents a relative rotation between the drag link and the slide bushing.

The drag link may be a rack.

A steering actuator may furthermore be provided, which comprises a drag link guide assembly of the aforementioned type.

The steering actuator may take the form of a steer-by-wire steering actuator. The steering actuator may be provided both on a front axle (front axle steering) and on a rear axle (rear axle steering) of a motor vehicle, if the motor vehicle has a steered rear axle.

In producing the drag link guide assembly, a fixing bush, which presses the slide bushing against an axial stop provided at the end of the locating area, may be inserted into the socket portion. As already described, the fixing bush is capable of fixing the slide bushing in an axial direction inside the locating area, since the slide bushing bears on the axial stop or is pushed or pressed against this by the fixing bush.

In principle the slide bushing may be formed, in particular integrally formed, from a plastic material. The slide bushing is an injection-molded part, for example, in particular a two-component injection-molded part.

The slide bushing may also be provided with a coating, particularly in the contact area with the housing. The coating may be provided by slide foils that have been applied.

BRIEF DESCRIPTION OF THE DRAWINGS

Further advantages and characteristics of the present disclosure ensue from the following description and the drawings, to which reference is made. In the drawings.

DETAILED DESCRIPTION

Figure 1:
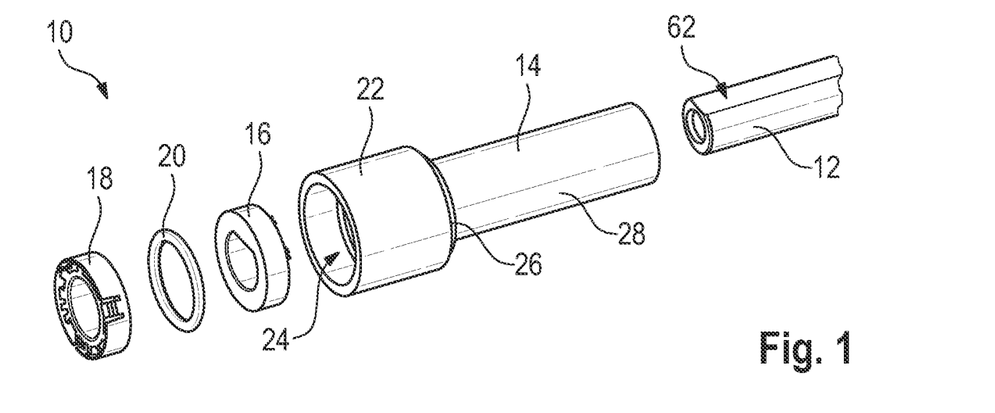
FIG. 1 shows an exploded view of a drag link guide assembly according to the present disclosure in a first embodiment.
Figure 2:
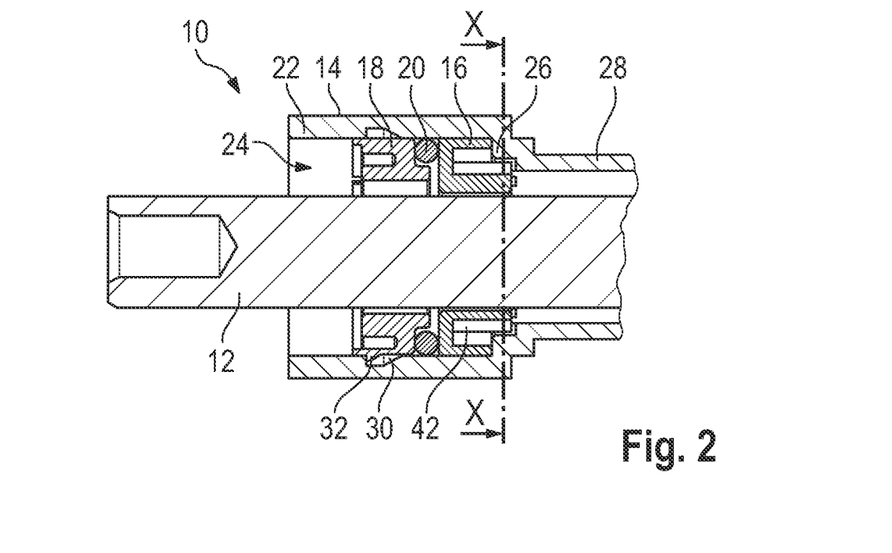
FIG. 2 shows a longitudinal section through the drag link guide assembly in FIG. 1 in the assembled state.
Figure 3:
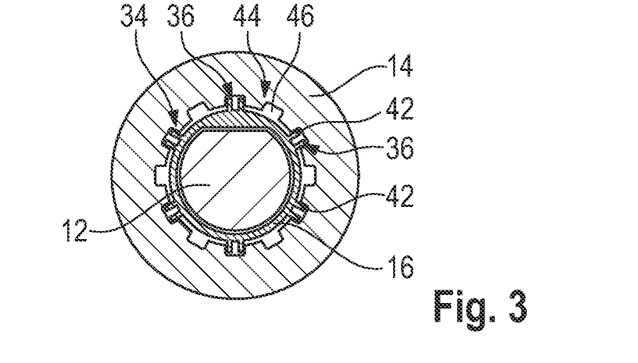
FIG. 3 shows a cross-sectional view along the line X-X in FIG. 2.

FIGS. 1 to 3 show a drag link guide assembly 10 which serves for guiding a drag link 12 of a steering system, in particular a steer-by wire (SbW) steering system.

The drag link guide assembly 10 comprises a housing 14, in which a slide bushing 16 and a fixing bush 18 are received.

An elastic force transmission element 20, which in the embodiment shown takes the form of an O-ring, is provided between the slide bushing 16 and the fixing bush 18.

The housing 14 comprises a socket portion 22, which is of substantially circular cylindrical formation. The socket portion 22 has an open end 24 and an axial stop 26, which is provided at an opposite end to the open end 24.

The axial stop 26 forms the transition from the socket portion 22 to a guide portion 28 of the housing 14, in which only the drag link 12 is accommodated.

As will be clear in particular from FIG. 2, the axial stop 26 is formed by a step in the housing 14, so that the diameter of the socket portion 22 is stepped down by the axial stop 26 to the diameter of the guide portion 28.

It will also be seen from FIG. 2 that the slide bushing 16 bears on the axial stop 26, the slide bushing 16 being pressed against the axial stop 26 by the fixing bush 18 and the intervening force transmission element 20.

A groove 30 is furthermore provided in the socket portion 22, that is to say on the inside of the housing 14. The groove 30 is of radially circumferential formation, as is also clear from FIG. 5.

A spring lug 32 provided radially outside the fixing bush 18 engages in the radially circumferential groove 30, in order to fix the fixing bush 18 in an axial direction relative to the housing 14.

This ensures that the fixing bush 18 is not able to move in the direction of the open end 24 of the socket portion 22.

Since the fixing bush 18 is moreover supported via the force transmission element 20 on the slide bushing 16, which in turn bears directly on the axial stop 26, the fixing bush 18 is also unable to move in the other axial direction.

In other words, the fixing bush 18 and the slide bushing 16 are arranged, fixed in an axial direction, inside the socket portion 22 of the housing 14.

The groove 30 may have an undercut, so that when pushing the slide bushing 16 into the socket portion 22 the spring lug 32 hooks or latches behind the undercut.

Figure 4:
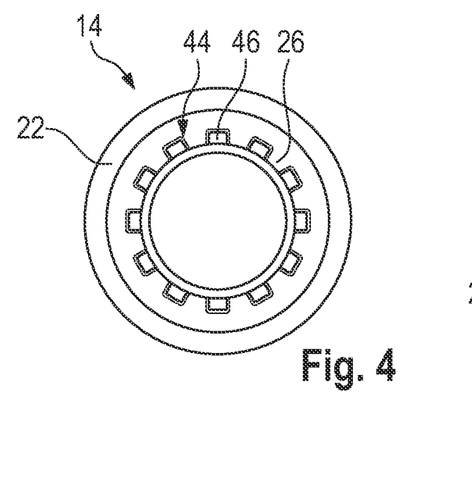
FIG. 4 shows a top view of the housing of the drag link guide assembly according to the present disclosure represented in FIGS. 1 to 3.
Figure 5:
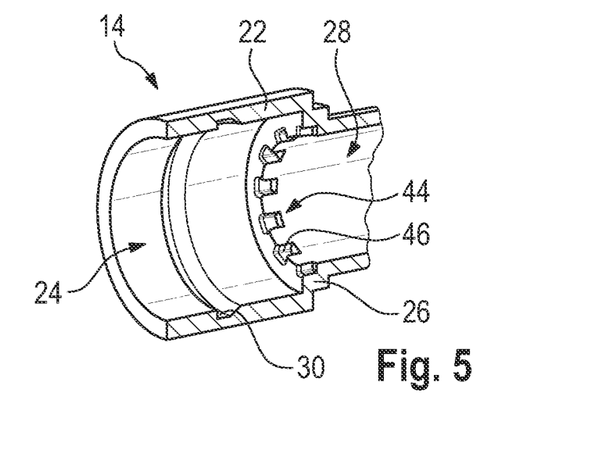
FIG. 5 shows a sectional representation of the housing in FIG. 4 in a perspective view.

It is clear from FIGS. 3 to 5, moreover, that a part of a torsional lock 34 is formed on the axial stop 26. This part interacts with the slide bushing 16 to form the torsional lock 34, which prevents any torsion of the slide bushing 16 relative to the housing 14.

The slide bushing 16, which is shown in various views in FIGS. 6 to 9, for this purpose comprises an outward-pointing structure 36, which is provided on a portion 40 projecting in axial direction from a body 38 of the slide bushing 16.

In the embodiment shown the outward-pointing structure 36 is formed by radially outward projecting webs 42, which engage correspondingly in the mating structure 44 provided on the housing 14, which comprises depressions 46, as can be seen from FIGS. 3 to 5.

In the assembled state of the drag link guide assembly 10 the structure 36 engages in the mating structure 44, which is provided on the internal surface of the housing 14. In other words, the webs 42 engage in the depressions 46, thereby ensuring that the slide bushing 16 is not able to twist relative to the housing 14.

It is also apparent from FIG. 3 that the number the webs 42, which here are formed in pairs, is smaller than the number of depressions 46. In the embodiment shown the ratio is 2:1.

The webs 42 and the depressions 46 are however spaced at uniform intervals over the circumference of the outer surface of the portion 40 of the slide bushing 16 projecting in an axial direction, and the internal surface of the housing 14.

It can moreover be seen from FIG. 5 that the depressions 46 widen out towards the socket portion 22, so that the slide bushing 16 can easily be inserted by its structure 36 into the housing 14, since the structure 36 need not be precisely aligned with the mating structure 44. In other words, when inserting the slide bushing 16 a centering of the slide bushing 16 occurs relative to the housing 14.

Figure 8:
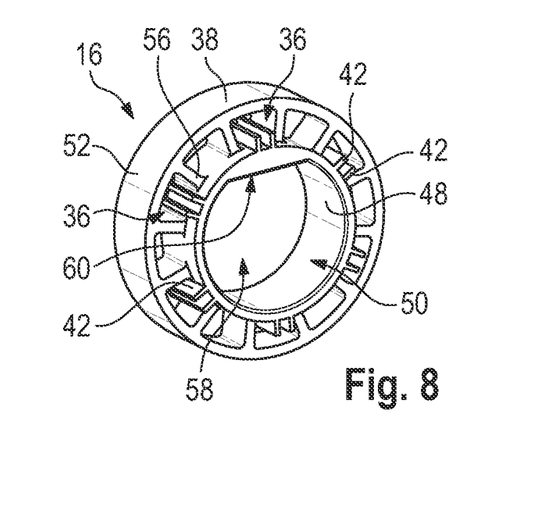
FIG. 8 shows a perspective frontal view of the rear side of the slide bushing in FIG. 6.
Figure 9:
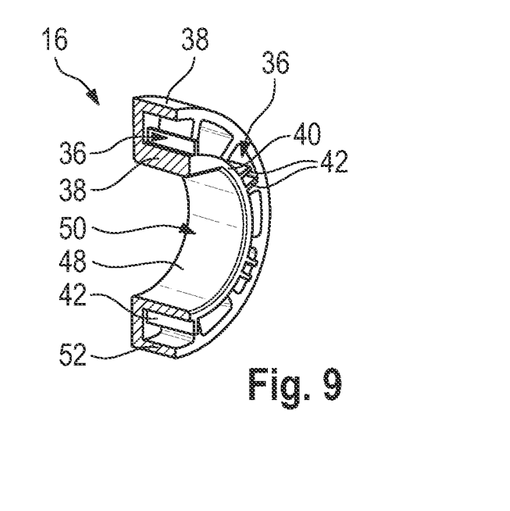
FIG. 9 shows a sectional representation of FIG. 8.
Figure 10:
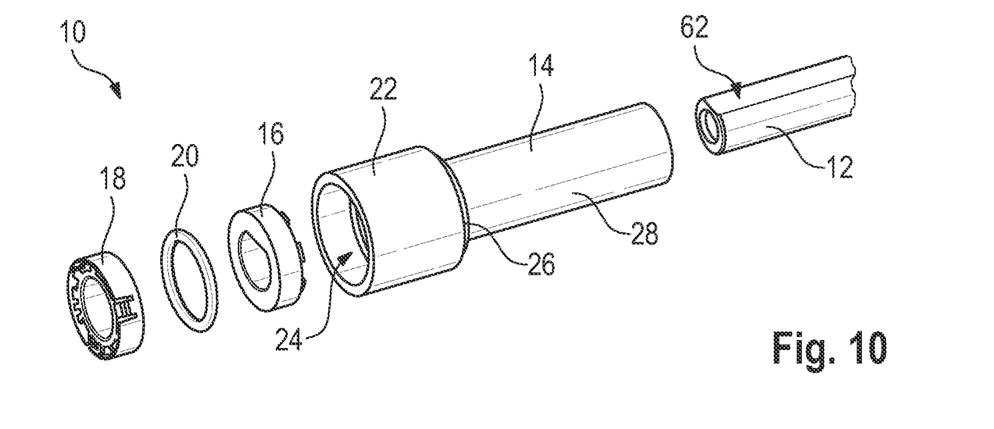
FIG. 10 shows an exploded view of a drag link guide assembly according to the present disclosure in a second embodiment.
Figure 11:
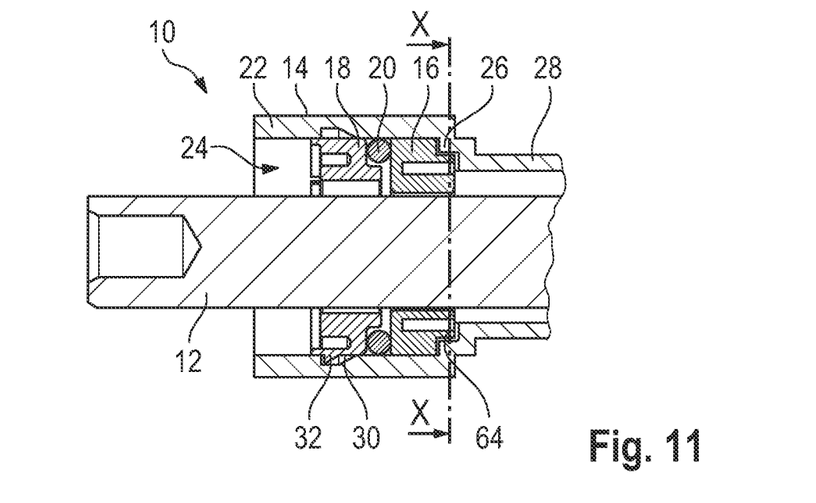
FIG. 11 shows a longitudinal section through the drag link guide assembly in FIG. 10 in the assembled state.
Figure 12:
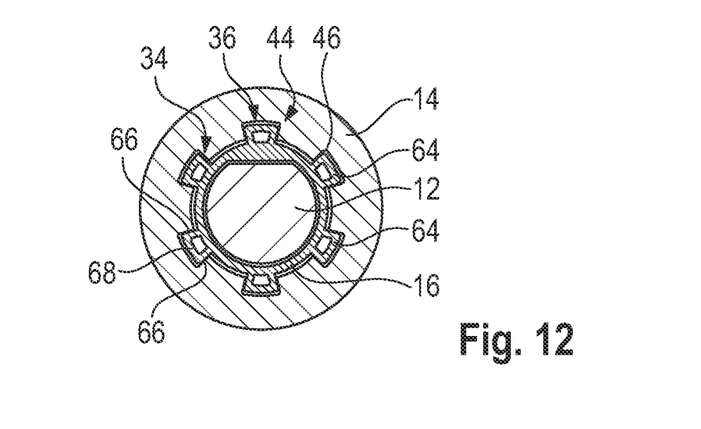
FIG. 12 shows a cross-sectional view along the line X-X in FIG. 11.
Figure 13:
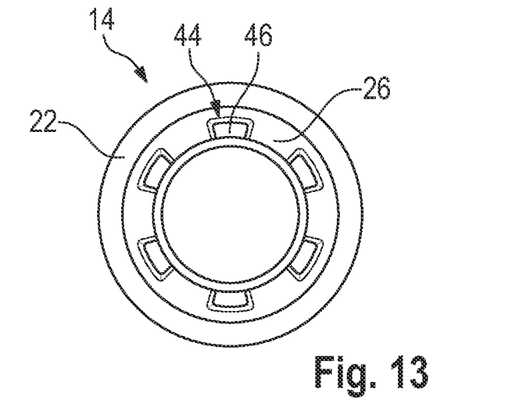
FIG. 13 shows a top view of the housing of the drag link guide assembly according to the present disclosure represented in FIGS. 10 to 12.
Figure 14:
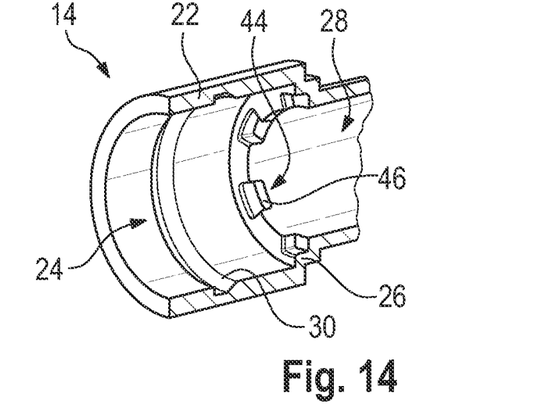
FIG. 14 shows a sectional representation of the housing in FIG. 13 in a perspective view.
Figure 15:
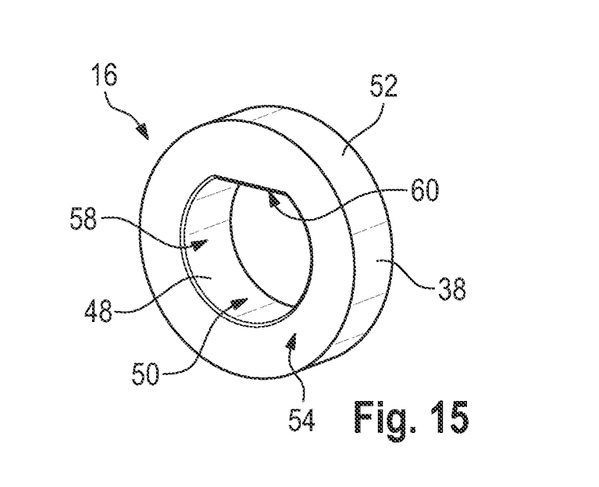
FIG. 15 shows a perspective frontal view of the front side of the slide bushing of the drag link guide assembly according to the present disclosure, according to FIGS. 10 to 12.
Figure 16:
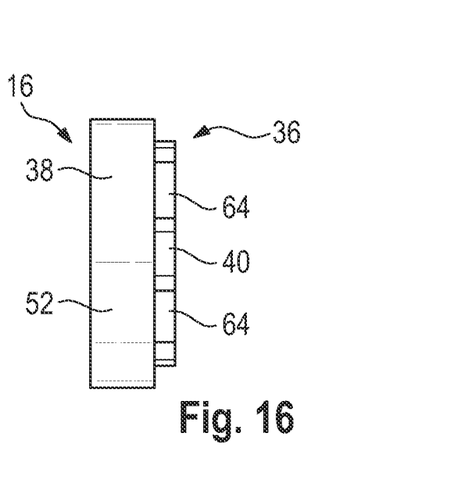
FIG. 16 shows a side view of the slide bushing in FIG. 15.
Figure 17:
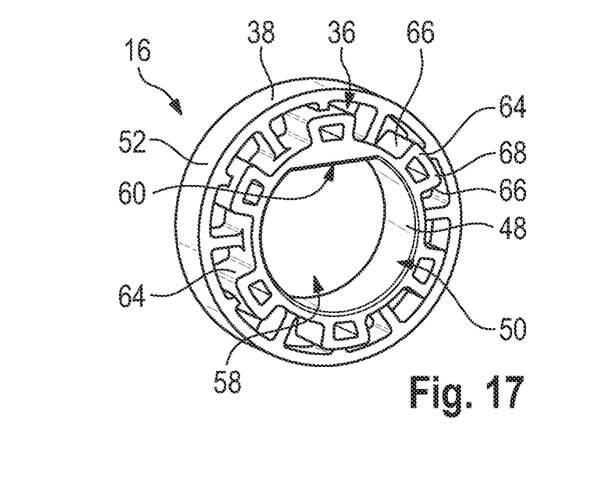
FIG. 17 shows a perspective frontal view of the rear side of the slide bushing in FIG. 15.
Figure 18:
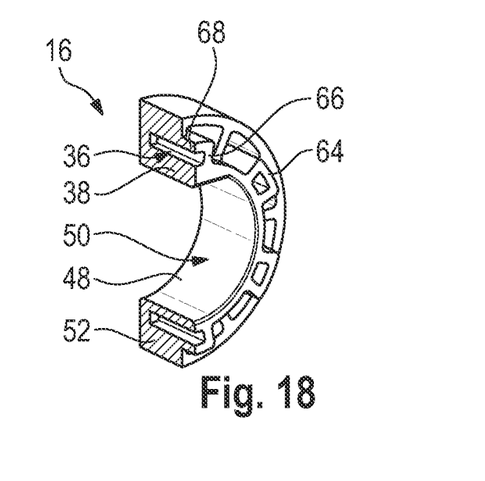
FIG. 18 shows a sectional representation of FIG. 17.

In addition, it can be seen from FIGS. 8 and 9 that the slide bushing 16 comprises an inner ring portion 48, which defines a locating area 50 for the drag link 12 and the portion 40 projecting in an axial direction.

In addition, the slide bushing 16 comprises an outer ring portion 52, which bears on the internal surface of the housing 14, as is clear from FIG. 2.

Figure 6:
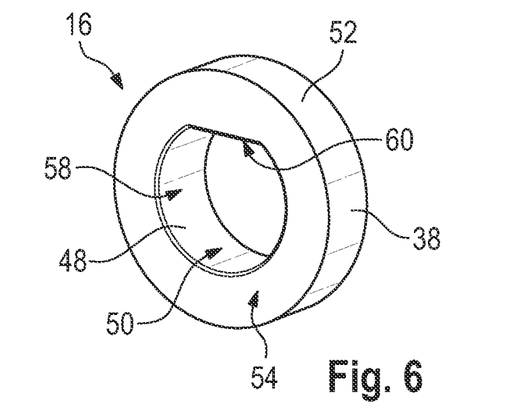
FIG. 6 shows a perspective frontal view of the front side of the slide bushing of the drag link guide assembly according to the present disclosure, according to FIGS. 1 to 3.
Figure 7:
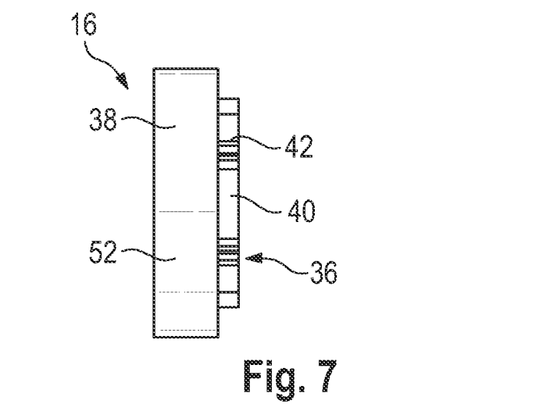
FIG. 7 shows a side view of the slide bushing in FIG. 6.

The inner ring portion 48 and the outer ring portion 52 are connected to one another at an end face 54 of the slide bushing 16, which is shown in FIG. 6. To put it another way, the inner ring portion 48 and the outer ring portion 52 merge into one another via the end face 54.

In addition, the slide bushing 16 comprises multiple braces 56, which extend from the inner ring portion 48 to the outer ring portion 52, thereby ensuring the stability of the slide bushing 16. At the same time this structure results in a relatively low weight of the slide bushing 16.

It can be seen from FIGS. 8 and 9 that a pair of webs 42 is arranged between each two adjacent braces 56.

The slide bushing 16 is in particular formed from a plastic material, in particular integrally formed.

The slide bushing 16 moreover comprises a locating area 58 for the drag link 12 having a substantially circular cylindrical periphery with at least one plane torsional locking face 60. The drag link 12 has a flattening 62, which corresponds to the plane torsional locking face 60, as can be seen from FIG. 1.

The corresponding formation of the locating area 40, that is to say the plane torsional locking face 60, serves to ensure that a torsional lock is formed between the drag link 12 and the slide bushing 16.

In addition, the slide bushing 16 is received so that it cannot twist in the housing 14, since the slide bushing 16 comprises an outward-pointing structure 36 which interacts with the mating structure 44 provided on the housing 14 to form a corresponding torsional lock.

FIGS. 10 to 18 show a second embodiment of the drag link guide assembly 10 which differs from the first embodiment in the configurations of the outward-pointing structure 36 of the slide bushing 16 and the mating structure 44, which is provided on the internal surface of the housing 14. These differences can be seen, in particular, from FIGS. 11 to 18.

Only the ways in which the second embodiment differs from the first embodiment are examined below, reference otherwise being made to the description above.

In the second embodiment the outward-pointing structure 36 of the slide bushing 16 comprises multiple radially outward-pointing projections 64.

The projections 64 each comprise two radially outward projecting webs 66, which are connected to one another by means of a cross-web 68 at their radially outward-pointing ends.

The radially outward projecting webs 66 and the cross-web 68 define a cavity 70.

The cavity 70 may afford a resilient effect, since the radially outward projecting webs 66 are pushed into the cavity 70.

With the slide bushing 16 according to the second embodiment the formation of the projections 64 makes it possible to transmit a high torque, in particular a higher torque than with the slide bushing 16 according to the first embodiment. Moreover, the structure of the projections 64 results in a greater radial rigidity compared to the webs 42.

This is due, in particular, to the cross-web 68, which joins the two radially outward projecting webs 66, which substantially correspond to the webs 42 of the slide bushing 16 according to the first embodiment. As a result, the forces are better distributed, so that overall a higher torque can be transmitted and a greater radial rigidity is achieved.

In the embodiment shown the slide bushing 16 comprises a total of six projections 64, which are arranged uniformly distributed over the outer circumference of the slide bushing 16.

For this purpose, the internal surface of the housing 14 comprises correspondingly formed depressions 46, in which in the assembled state the projections 64 are received.

What is claimed is:

1. A drag link guide assembly for guiding a drag link, comprising a slide bushing and a housing enclosing the slide bushing, wherein the housing comprises a socket portion into which the slide bushing is inserted, wherein the slide bushing comprises a locating area for the drag link having a substantially circular cylindrical periphery with at least one plane torsional locking face, the at least one plane torsional locking face being configured to prevent a relative rotation between the drag link and the slide bushing, and wherein the slide bushing comprises an outward-pointing structure which interacts with a mating structure which is provided on an internal surface of the housing, the outward-pointing structure being provided, at least in part, on a portion of the slide bushing projecting in an axial direction, the outward-pointing structure comprising multiple radially outward-projecting webs or projections and/or the mating structure comprising at least one depression in the internal surface of the housing, an axial stop being provided at one end of the socket portion, the mating structure being provided on the axial stop, the socket portion being of a substantially circular cylindrical formation and having a radially circumferential groove on its inside, a fixing bush, which fixes the slide bushing in an axial direction inside the socket portion, being accommodated in the socket portion, the fixing bush comprising at least one spring lug, which is provided radially outside, wherein the spring lug engages in the groove in order to secure the fixing bush in an axial direction inside the socket portion.

2. The drag link guide assembly as claimed in claim 1, characterized in that an elastic force transmission element is provided between the fixing bush and the slide bushing.

3. The drag link guide assembly as claimed in claim 1, characterized in that the at least one plane torsional locking face prevents the relative rotation between the drag link and the slide bushing when engaged to the drag link.

4. The drag link guide assembly as claimed in claim 1, further comprising the drag link, the drag link having a flattening that is engaged by the at least one torsional locking face to prevent the relative rotation between the drag link and the slide bushing.

5. A drag link guide assembly for guiding a drag link, the drag link guide assembly comprising:
- a housing having a groove and a mating structure formed therein;
- a slide bushing in the housing and having an outward-pointing structure that interacts with the mating structure, the slide bushing including a locating area for the drag link having a substantially circular cylindrical periphery with a plane torsional locking face; and
- a fixing bush in the housing and preventing movement of the slide bush in an axial direction relative to the housing, an engagement member of the fixing bush extending from an outer surface of the fixing bush into the groove to prevent axial movement of the fixing bush relative to the housing.

6. The drag link guide assembly as claimed in claim 5, characterized in that the engagement member is a spring lug.

7. The drag link guide assembly as claimed in claim 5, further comprising an elastic force transmission element between the fixing bush and the slide bushing.

\* \* \* \* \*